J. F. LOWERY.
GASOLENE SEPARATOR.
APPLICATION FILED APR. 23, 1910.

989,620.

Patented Apr. 18, 1911.

Witnesses
C. Richardson.
P. M. Smith.

Inventor
James Frank Lowery
By Victor J. Evans
Attorney

UNITED STATES PATENT OFFICE.

JAMES FRANK LOWERY, OF TILGHMAN ISLAND, MARYLAND.

GASOLENE-SEPARATOR.

989,620.

Specification of Letters Patent. Patented Apr. 18, 1911.

Application filed April 23, 1910. Serial No. 557,224.

*To all whom it may concern:*

Be it known that I, JAMES FRANK LOWERY, a citizen of the United States, residing at Tilghman Island, in the county of Talbot and State of Maryland, have invented new and useful Improvements in Gasolene-Separators, of which the following is a specification.

This invention relates to gasolene separators, the object of the invention being to provide a simple, economical and efficient device for separating from gasolene or the like all water, sediment and other foreign matter, the device being preferably in the form of an attachment for use in connection with any gasolene tank or other reservoir for the purpose of effecting the separation of water and sediment from the gasolene preparatory to the outflow of the gasolene from the tank through the feed pipe to the carbureter or engine.

With the above and other objects in view, the invention consists in the novel construction, combination and arrangement herein fully described, illustrated and claimed.

Figure 1:
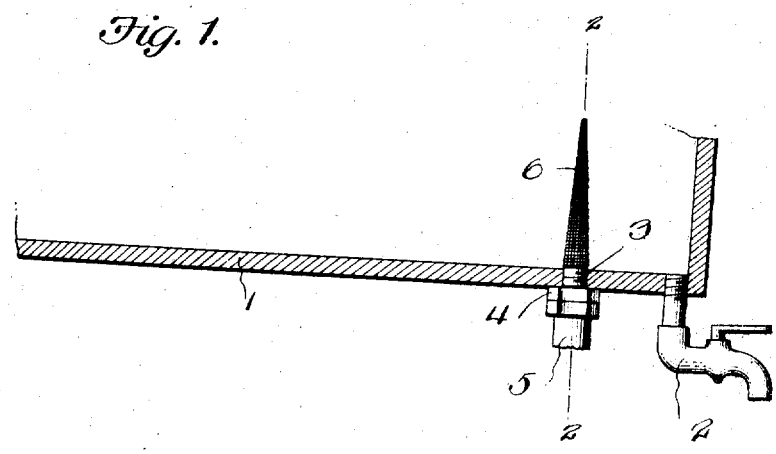
Figure 2:
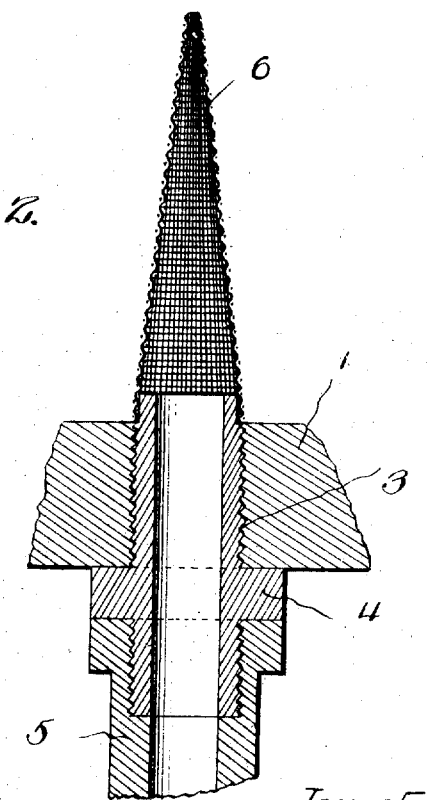

In the accompanying drawings:—Figure 1 is a vertical section through a portion of a gasolene tank showing the improved separator and also showing the tank provided with a draw-off cock. Fig. 2 is an enlarged vertical section through the separator, the tank and the adjacent end of the feed pipe.

Referring to the drawings, 1 designates an ordinary gasolene tank or reservoir which is shown provided with a draw-off cock 2 through which the separated water and sediment may be removed from the tank. The separator of this invention comprising a threaded nipple or fitting 3 which is shown as being threaded through an opening in the bottom of the tank 1 and provided with an enlarged head 4 adapted to receive a wrench or other suitable instrument for screwing the nipple into place in the tank. It will be understood, however, that the said nipple or fitting may be fastened to the tank in any usual or preferred manner. In some cases it may be found expedient to dispense with the head 4 which is not essential to the invention but which is shown for convenience in applying the device as a whole to the tank, and as also affording shoulders at opposite sides thereof for contact with the tank and the adjacent end of the feed pipe. The feed pipe shown at 5 is connected to the nipple in the manner illustrated in Fig. 2 or in any other approved way, said feed pipe leading therefrom to the engine or carbureter.

In carrying out the present invention, I employ a long tapering cone shaped strainer or separator body 6 composed preferably of fine wire mesh which will insure the separation of all water and sediment from the gasolene, the gasolene passing readily through the meshed fabric of the separator into and through the feed pipe 5. This cone shaped separator projects well up into the tank and on account of its long tapering shape, the sediment gravitates downward along the almost perpendicular sides of the separator and lodges on the bottom of the tank. It may be further noted that by reason of the meshes of the separator body being at all times filled with gasolene, the heavier matter consisting of water and sediment will be unable to find its way through the meshes and will therefore be forced to gravitate downward along the exterior surface of the separator body. The separator body may be secured to the nipple or fitting in any convenient way.

What I claim is:—

A gasolene separator including a nipple exteriorly threaded for connection with the tank opening and having an unthreaded portion of less diameter than the threaded portion and adapted to project above the bottom of the tank when the nipple is in place, and a cone-shaped separator body of wire mesh secured to the unthreaded portion of the nipple and having its maximum diameter corresponding to the diameter of said unthreaded portion, whereby the nipple and separator body may be simultaneously applied and detached.

In testimony whereof I affix my signature in presence of two witnesses.

JAMES FRANK LOWERY.

Witnesses:
HENRY C. LOWERY,
WALTER M. SEWELL.